United States Patent
Shemer et al.

(10) Patent No.: US 11,880,286 B2
(45) Date of Patent: *Jan. 23, 2024

(54) ON THE FLY PIT SELECTION IN CLOUD DISASTER RECOVERY

(71) Applicant: EMC IP Holding Company LLC, Hopkinton, MA (US)

(72) Inventors: Jehuda Shemer, Kfar Saba (IL); Kfir Wolfson, Beer Sheva (IL); Tomer Kushnir, Ramat Gan (IL); Jawad Said, Kfar Yasif (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/064,374

(22) Filed: Dec. 12, 2022

(65) Prior Publication Data

US 2023/0108127 A1  Apr. 6, 2023

Related U.S. Application Data

(63) Continuation of application No. 16/910,393, filed on Jun. 24, 2020, now Pat. No. 11,531,599.

(51) Int. Cl.
*G06F 11/00* (2006.01)
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1451* (2013.01); *G06F 11/1484* (2013.01); *G06F 2009/45575* (2013.01); *G06F 2201/815* (2013.01)

(58) Field of Classification Search
CPC ............ G06F 11/1448; G06F 11/1451; G06F 11/1458; G06F 11/1469; G06F 11/1484; G06F 2201/815; G06F 9/45558; G06F 2009/45575

See application file for complete search history.

(56) References Cited

U.S. PATENT DOCUMENTS

| | | |
|---|---|---|
| 10,120,764 B1 | 11/2018 | Ramachandran et al. |
| 11,068,356 B2 | 7/2021 | Agrawal et al. |
| 11,531,598 B2 * | 12/2022 | Kushnir ............ G06F 11/1464 |
| 11,531,599 B2 * | 12/2022 | Shemer ............ G06F 11/1464 |
| 2012/0017114 A1 | 1/2012 | Timashev et al. |
| 2015/0127612 A1 | 5/2015 | Balcha et al. |
| 2015/0143064 A1 | 5/2015 | Bhargava et al. |
| 2016/0048408 A1 | 2/2016 | Madhu et al. |

(Continued)

OTHER PUBLICATIONS

International Preliminary Report on Patentability received for PCT Patent Application No. PCT/US2021/029078, dated Dec. 1, 2022, 13 pages.

(Continued)

*Primary Examiner* — Marc Duncan
(74) *Attorney, Agent, or Firm* — Workman Nydegger (57) ABSTRACT

On-the-fly point-in-time recovery operations are disclosed. During a recovery operation, the PiT being restored can be changed on-the-fly or during the existing recovery operation without restarting the recovery process from the beginning. In one example, this improves recovery time operation (RTO) and prevents aspects of the recovery operation to be avoided when changing to a different PiT.

20 Claims, 6 Drawing Sheets

(56) References Cited

U.S. PATENT DOCUMENTS

| | | |
|---|---|---|
| 2018/0276085 A1 | 9/2018 | Mitkar et al. |
| 2018/0284986 A1 | 10/2018 | Bhagi et al. |
| 2019/0129621 A1 | 5/2019 | Kushwah et al. |
| 2019/0163580 A1 | 5/2019 | Pandey et al. |
| 2021/0255771 A1 | 8/2021 | Kilaru et al. |
| 2021/0365330 A1 | 11/2021 | Kushnir et al. |

OTHER PUBLICATIONS

International Search Report and Written Opinion received for PCT Patent Application PCT/US2021/029078, dated Aug. 12, 2021, 19 pages.

* cited by examiner

ON THE FLY PIT SELECTION IN CLOUD DISASTER RECOVERY

FIELD OF THE INVENTION

Embodiments of the present invention generally relate to data protection and data protection operations. More particularly, at least some embodiments of the invention relate to systems, hardware, software, computer-readable media, and methods for data protection operations including point in time backup and recovery operations.

BACKGROUND

Cloud storage providers include, for example, Amazon, Microsoft, and Google. The cloud storage available from these providers is becoming more ubiquitous and is used for various purposes. The storage may come in various flavors or tiers and allows data to be stored differently. Storage types include, by way of example, object-based storage and block based storage. In addition to storage, cloud providers often provide compute environments.

Cloud storage may be used for replication, backup, and disaster recovery purposes. In fact, one reason for using cloud storage for data protection is to be able to recover data, failover, or the like. Some data protection systems offer point in time (PiT) recovery operations. A user may select a point in time and the system may recover the data (e.g., virtual machine/application/data) to the selected point in time. If, however, the data recovered for that point in time is not the data that was actually needed, the entire recovery process is performed again for another PiT selection.

This is a problem because the recovery process for certain data stored in the cloud, such as virtual machines, can be quite lengthy. This is, in part, related to the fact that it is often necessary to perform a virtual machine conversion as part of the recovery operation. For example, the virtual machine (or backup) is retrieved or accessed from storage and prepared to run on an appropriate hypervisor. This requires the virtual machine to be converted. The time needed to convert the virtual machine to run on the hypervisor is related to the size of the disks being imported or converted. For example, recovering a virtual machine with 5 Terabytes (TB) of total disk space may require, for example, from 16 to 36 hours. Selecting the wrong point in time to recover may have a substantial and adverse impact on the customer and can significantly increase the time needed to perform the recovery operation because the entire process must be started over from the beginning.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for performing data protection operations including, but not limited to, recovery operations, point in time (PiT) recovery operations, backup operations, replication operations, disaster recovery operations, failover operations, point in time backup operations, cloud based data protection operations, and the like or combination thereof.

Example embodiments of the invention relate to performing a cloud-based recovery operation. More particularly, embodiments of the invention relate to cloud-based recovery operations including point in time recovery operations for virtual machines or applications running on virtual machines. Embodiments of the invention further relate to on-the-fly PiT recovery operations where the PiT to be recovered to can be changed on-the-fly or within the context of the current recovery operation.

Generally, cloud recovery operations require a user to select the exact point in time to recover to. The cloud may store a plurality of PiTs (e.g., snapshots or other backups) and the recovery operation requires that a specific PiT be selected. In fact, the specific point in time is identified in advance of or near the beginning of the recovery operation. As previously stated, once the PiT is selected, moving to an earlier PiT or to a later PiT conventionally requires a separate recovery flow or a separate recovery operation. Cloud RTO (Recovery Time Objective) for a recovery operation typically includes the time associated with disk or volume hydration and virtual machine conversion. Once the virtual machine has been converted (a process that can take hours), a customer may discover that the PiT used for the recovery operation is the wrong PiT—an earlier or later PiT should have been selected. Conventionally, the entire process—including the hydration and virtual machine conversion—would need to be performed again for the newly selected PiT. This increases the RTO substantially.

As discussed herein, embodiments of the invention may include processes of attaching/detaching or mount/unmounting virtual disks or volumes to a virtual machine. By way of example and not limitation, attaching/detaching may refer to devices such as physical or virtual drives and mount/unmounting may refer to file systems. However, these terms may be used interchangeably. Further, attaching a virtual disk or volume to a virtual machine may include the process of mounting the file system Embodiments of the invention enable a customer to move forward and backward in time on-the-fly without running a completely new recovery operation. In other words, a user can effectively select a different PiT prior to finishing the current recovery operation. The ability to change from one PiT to another PiT are part of the same operation. Aspects of a recovery operation, such as virtual machine conversion, can be omitted when the originally selected PiT turns out to be the wrong one. Embodiments of the invention improve the capabilities and efficiencies of the recovery operation in the cloud and allows users to recover to the correct or accurate PiT faster and more efficiently.

The following discussing references, for example, cloud storage. Embodiments of the invention may be implemented in many different cloud environments and are not limited to any particular cloud-based storage or format. Embodiments of the invention may also be implemented in Dell EMC Cloud Services or Dell EMC Cloud DR or other cloud replication applications. Further, embodiments of the invention may refer to different storage configurations or types.

For discussion purposes, embodiments of the invention may reference AWS (Amazon Web Services), which includes S3 (Simple Storage Services) and EC2 (Elastic Cloud Compute) services. S3 is an object based storage and an EC2 instance may be a virtual machine.

Backups or snapshots or other representations of virtual machines or data thereof may be stored in object storage in small segments that, when combined, create the virtual machine disks or volumes. A data protection system such as Dell EMC Cloud DR may use 4 MB segments. As a result, a 4 GB volume may have about 1000 4 MB segments.

Replicas or backups can be stored in various forms including snapshots. When storing multiple snapshots, images, or, more generally, PiTs, there is no need to store all of the segments of a volume in each PiT. Generally, a base Pit has all of the segments of the volume or volumes. Subsequent PiTs may only have those segments whose data has changed since the previous PiT. Depending on the rate at which PiTs such as snapshots or backups are taken, this is often a very small percentage of segments.

Generally, the recovery process or disaster recovery process in the cloud often begins by hydrating the virtual machine. Hydration is a process of combining the segments of the PiT backups in the correct order to reconstruct the virtual machine (or the disks or volumes) as the disks or volumes existed at the time of the selected PiT backup.

As previously stated, the PiT backups may be stored in an object storage such as S3. During the recovery process, data stored in the object storage may be moved to a block storage device or other storage format or type. In one example, the data being recovered are written to a device or storage that is configured for use with virtual machines. Amazon EBS (Elastic Block Store) is storage for the drives of virtual machines. The segments are retrieved or downloaded from the object storage (e.g., S3) and placed in the correct locations on the block volume such as an EBS volume. Multiple segments can be downloaded and written in parallel. This type of hydration is performed for each volume of the virtual machine separately in one example.

A virtual machine conversion is performed. For example, an ec2 import-image command may be used. The cloud system (e.g., AWS) may take a full copy of the virtual machine from the object storage and prepare the operating system of the virtual machine to run in a cloud hypervisor (e.g., AWS hypervisor) in the context of cloud services. This may include adding/removing device drivers, removing virtual machine tools, setting configurations, and the like. Often, this conversion procedure is specific to the hypervisor and OS used. In one instance, the virtual machine conversion is a service provided by the cloud provider. Typically, the conversion may take time that is related to the size of the disks that are imported.

Embodiments of the invention can reduce the RTO of this process. For example, the virtual machine being converted may have more than one hard disk that requires conversion. In one example, the virtual machine may have an OS disk containing the operating system and data disks that contain the application data. The application executable can reside on the OS disk or the data disks.

The RTO can be improved by performing, in parallel, the conversion for the OS disk and the rehydration of the data disks. After both the conversion (e.g., to an EC2 instance) and the hydration of the data (e.g., from S3 storage to an EBS volume) are completed, the hydrated volume can be attached to the converted virtual machine instance.

Embodiments of the invention relate to recovering to a selected PiT with the ability to change the recovery PiT to an earlier or later PiT without having to perform a separate recovery operation from the beginning. The change can be performed on-the-fly. Before discussing the recovery operation in more detail, embodiments of the invention may include the following aspects. First, the conversion of the virtual machine typically makes changes to the operating system. Application data is not as affected because the data may not be platform dependent. Next, many virtual machines have a separate OS disk. In addition, virtual machines can be reconfigured or built such that the OS disk is separate from other disks.

Next, disks such as virtual data disks or volumes can be attached/detached to/from a virtual machine and moved between virtual machines. In addition, going to a later PiT once a virtual machine has been converted includes applying the next PiT data segments on the data disks. Going to a previous PiT includes identifying the segments that were changed and applying the latest data written before the previous PiT. Finally, the OS can keep running and the application can be restarted to use the new data residing on the updated data disks. This allows the PiT being recovered to be changed on-the-fly. Embodiments of the invention allow a different PiT to be recovered using the virtual machine that has already been converted. Generally, the data disks are detached from the recovered virtual machine, updated from the PiT backups to the appropriate PiT, and then reconnected to the recovered virtual machine.

Figure 1:
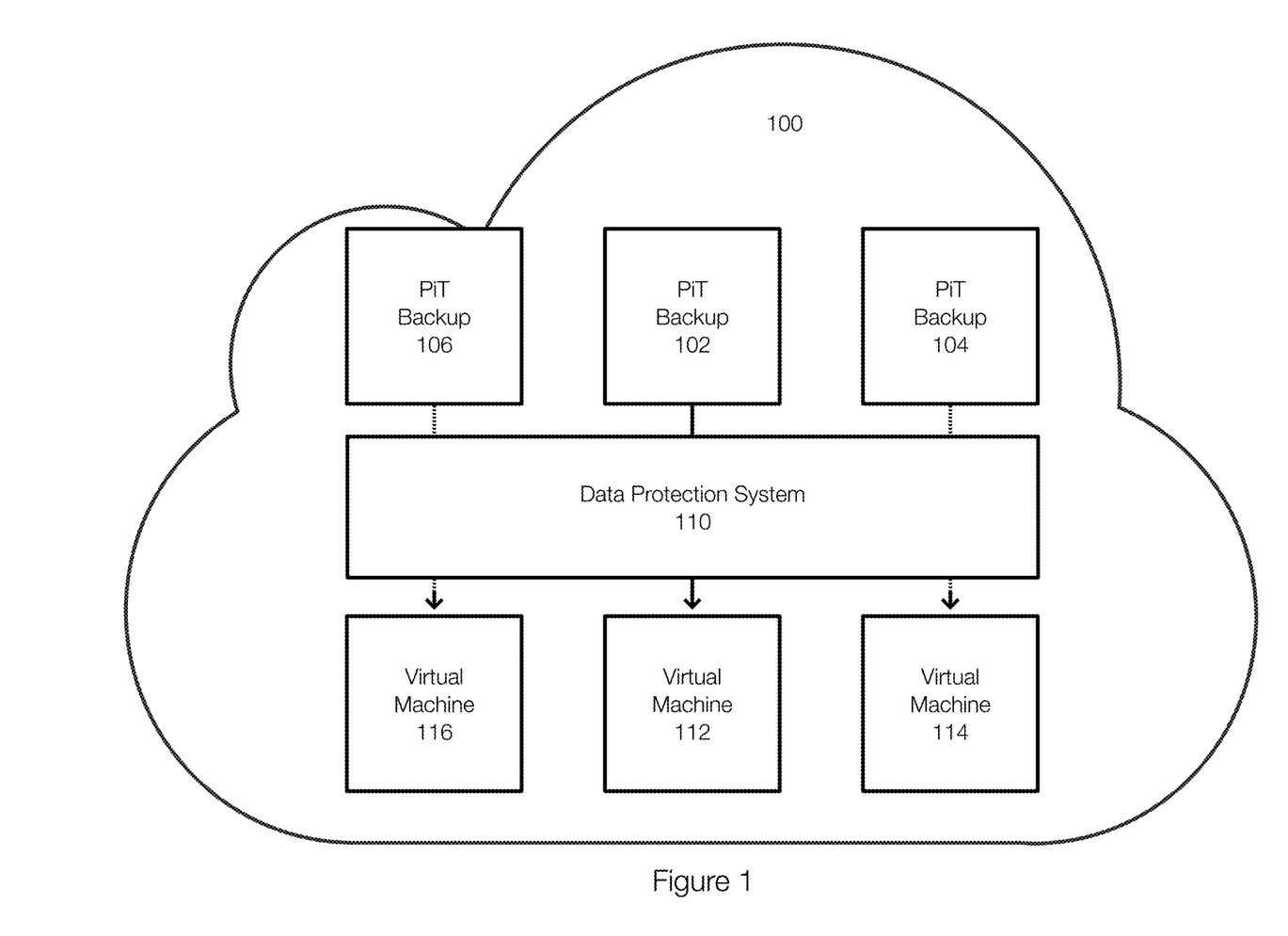
FIG. 1 discloses aspects of a data protection system configured to perform data protection operations including point in time recovery operations.

FIG. 1 illustrates an example computing system in which recovery operations may be performed. In this example, at least a portion of the data protection system 110 is cloud based and operates in the cloud (e.g., one or more datacenters) 100. Thus, the PiT backups may be stored in cloud storage. As previously indicated, the PiT backups may be stored in object based storage. The virtual machines or other devices, appliances, servers, etc., recovered from the PiT backups may also operate in the cloud 100. The cloud includes the hardware (e.g., processors, memory, network equipment) needed to store data (objects, segments, blocks, etc.) and run applications, containers, virtual machines, or the like. In addition, aspects of the computing system shown in FIG. 1 may be virtualized.

The data protection system 110 may include an appliance, server (physical, virtual, etc.) that is configured to perform data protection operations. The data protection system 110 may be configured to replicate or backup data (e.g., virtual machines/applications/application data) from a production site to a replica site. FIG. 1 illustrates at least a portion of a replica site where PiT backups have been stored and can be used for recovery operations, disaster recovery operations, and the like.

The data protection system 110 may also include a server/appliance at the production site (which may be an on-premise system or a cloud-based system) that coordinates with the data protection system 110 to perform data protection operations.

FIG. 1 illustrates a series of PiT backups 102, 104, and 106 that are related in time. This series of backups may include fewer or more backups. In addition, at least one of the PiT backups is a base backup that contains a full set of the production data at some point in time. Other backups may be incremental backups. The backups may be snapshots.

In this example, a recovery operation is being performed. FIG. 1 illustrates an example of restoring or recovering a virtual machine in the cloud. However, the PiT backup may correspond to multiple virtual machines, volumes, consistency groups, or other data.

The PiT backup 102 may be used to recover the virtual machine 112. Similarly, the PiT backup 104 can be used to recover the virtual machine 114, which may be at a later point in time than the virtual machine 112. The PiT backup 106 can be used to recover the virtual machine 116, which is at an earlier time than the virtual machine 112. Thus, the virtual machines, 112, 114, and 116 are the same virtual machines at different points in time in this example.

If a process to recover the virtual machine 112 from the PiT backup 102 is performed, embodiments of the invention allow an earlier virtual machine 116 or a later virtual machine 114 to be recovered without starting a new recovery operation from the beginning. Embodiments of the invention allow the recovery operation to allow the selected PiT to be moved to a new PiT, such as the PiT backup 106 or the PiT backup 104.

Figure 2:
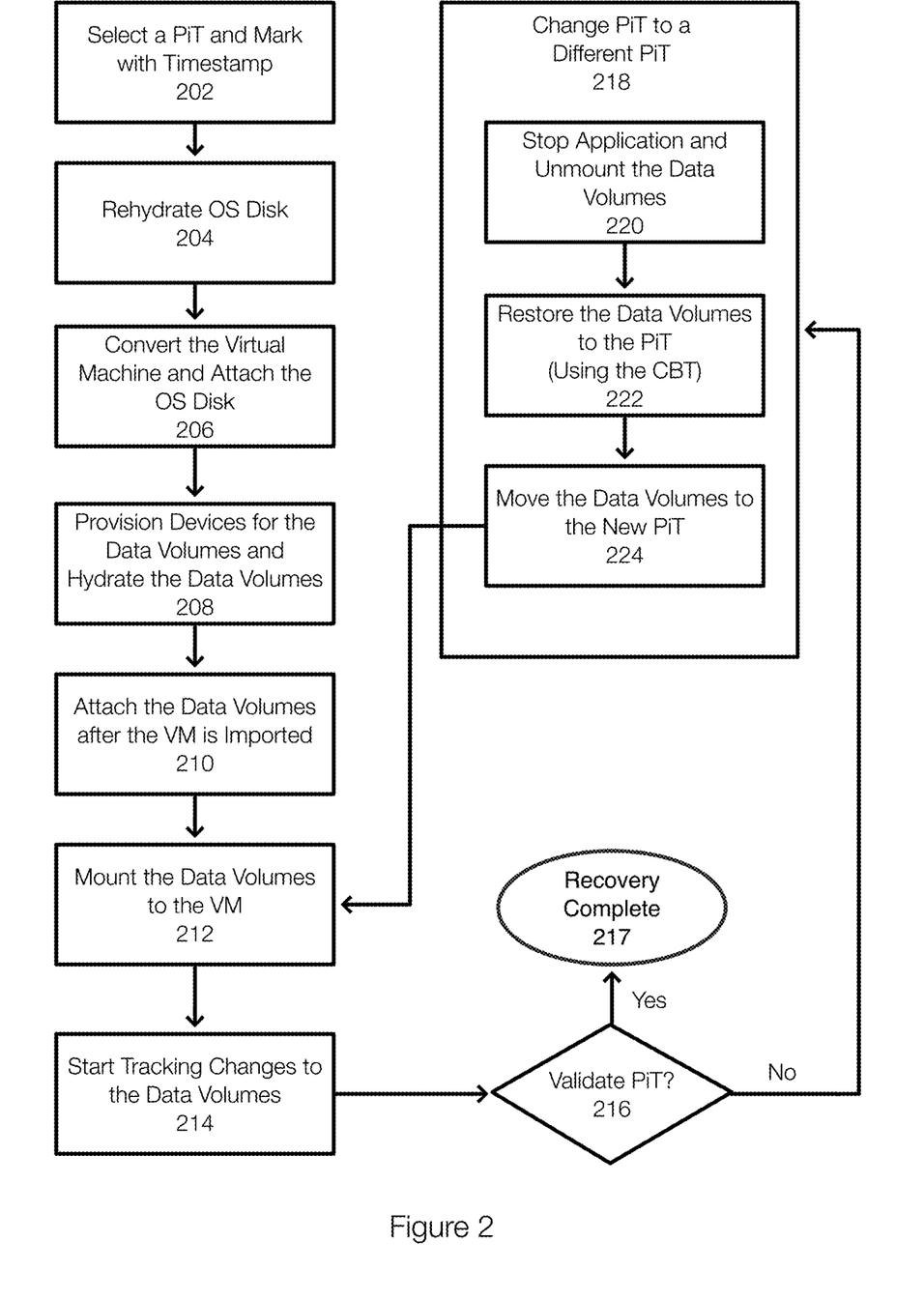
FIG. 2 illustrates an example of a method for performing a data protection operation including a point in time recovery operation.

FIG. 2 illustrates an example of recovering a virtual machine to a desired or selected PiT and then allowing the user to move to a different PiT without starting over. Embodiments of the invention can adapt the recovery operation to aspects that have already been performed, such as the virtual machine conversion.

In one example of a recovery operation, a PiT is selected 202. A PiT may be selected from a list of backups or snapshots. The selected PiT is marked with a timestamp, such as timestamp N. Snapshots or PiTs that occurred before or after the selected PiT may be referenced as or associated with timestamps . . . N−2, N−1, N+1, N+2 . . . .

After the PiT is selected, the OS disk is rehydrated 204. The hydration may occur in the same storage in which the data is stored or backed up (e.g., in the object storage or S3). Next, the virtual machine is converted 206 (e.g., using an import command) and the OS disk is attached to the converted virtual machine. The conversion may import an image of the virtual machine from the selected PiT to a compute environment. In one example, only the OS disk is attached. For Linux based OSes, other disks in fstab may be marked as optional/nofail.

The conversion, as previously stated, may include taking the full copy or image of the virtual machine from storage (e.g., S3) and preparing the imported virtual machine to run on a hypervisor (e.g., AWS hypervisor). This may include adding/removing device drivers, set configurations, and the like. In one example, the virtual machine being restored is provided with a change block driver. The change block driver is configured to track changes to the virtual volumes to be attached and mounted to the virtual machine.

At the same time, devices for all of the data disks are prepared or provisioned 208 in the region where the virtual machine is to be recovered. In other words, the data disks or volumes are rehydrated directly into these devices (e.g., EBS devices) and the hydration can be done with high parallelism. After the data disks are hydrated and the virtual machine is imported or converted, the data disks or devices are attached 210 to the converted virtual machine. The data volumes may also be mounted 212 to the converted virtual machine if not performed when attaching the data volumes to the converted virtual machine.

Once the converted machine is restored, the converted machine has been recovered to timestamp N, which corresponds to the PiT selected for recovery. Changes to the data volumes are tracked 214 by the change block driver. The change block driver is configured to track what blocks or segments in the data volumes mounted to the converted virtual machine have changed. Rather than tracking changes for backup purposes, the changes are tracked such that the converted virtual machine can be restored to the timestamp N if it is determined that the selected PiT was incorrect for any reason. The change block driver allows embodiments to revert or override the changed blocks or changed data.

By way of example, the change block driver may operate or work with a fixed block size (e.g., 4 MB). The blocks are represented as a bitmap that is persisted in the volume or disk at a known location or in a known path. The initial value for each segment (e.g., 0) indicates that the corresponding segment has not changed since the change block driver initiated.

The change block driver, which often starts together with the OS kernel and starts tracking changes, loads the bitmap from the data volumes once the data volumes or disks are launched (e.g., attached and mounted). The change block driver may perform certain procedures for each IO (e.g., write request).

Initially, the change block driver may calculate which segments the write request is pointing to (e.g., using the offset and buffer size/length). For these segments, a 1 is set in the relevant indexes or in the bitmap if the relevant indexes were 0. If the bitmap is updated, the copy of the bitmap on the disk is also updated. Thus, the change block driver may load the bitmap into memory and maintain a copy on the disk. The disk can be the same disk to which the IO is being sent and the bitmap can be saved as a file on the disk file system. In one example, each disk may have a copy of the bitmap or a relevant portion of the bitmap. More specifically in one example, each disk will have copy of the disk's bitmap "raw data" for their segments in a known path, for example in a directory called "/backup_data". This description assumes that each volume stores its own bitmap. It is possible to have one volume store the information for other volumes using a naming convention—volume id for example. Other than the bitmap location all the rest of the scheme is substantially similar if not identical.

Using 4 BM as the bit resolution to match the size of the data chunks stored in the cloud is by way of example. Other resolutions are possible with trade-offs in space and management overhead.

As a result, the change block driver is tracking changes 214 from the selected point in time. Next, the user may then validate 216 the recovered virtual machine at the selected PiT. If the validation is correct, the recovery may be complete 217. However, the recovered virtual machine at 214 (or at timestamp N) may not be correct (e.g., contains the wrong files, wrong version of data). For example, the user may determine whether the correct data has been recovered to the PiT recovered virtual machine when validating 216 the PiT.

In the event that there is a need to change the selected PiT to a previous or later PiT, the PiT is changed 218 to another PiT. A user may decide that the wrong PiT has been recovered and may select or identify a different PiT from the PiT backups. Changing the PiT may include stopping the application and detaching 220 the data volumes (or data disks) from the converted virtual machine and from the OS. The data volumes that have been detached are restored 222 to the PiT N using bitmap maintained by the change block driver. As previously stated, the snapshot N taken at 212 refers to the cloud-based snapshot performed on the recovery virtual machine after the virtual machine has been converted and the data disks have been attached to the recovery virtual machine.

Once the PiT has been restored to timestamp N using the bitmap associated with the change block driver, the PiT is then moved (by reading data from the PiT backups and writing to the volumes) 224 forward or backwards to a different PiT such as N-k or N+k. The newly selected PiT is marked k and the flow returns to element 212. At this stage, the change block driver may reinitialize the bitmap such that, if the newly selected PiT is not validated, the process can return to the new PiT. Thus, changes are tracked 214 from the newly recovered data volumes. If necessary, N is set equal to K after the data volumes have been moved to the newly selected PiT. Thus, the newly selected PiT is associated with a timestamp N that allows subsequent moves to earlier or later PiTs in the event that the recovered PiT is again incorrect with respect to timestamp N, although this can also be performed with respect to timestamp K. This allows a user to repeatedly select different PiTs repeatedly if necessary.

Figure 3:
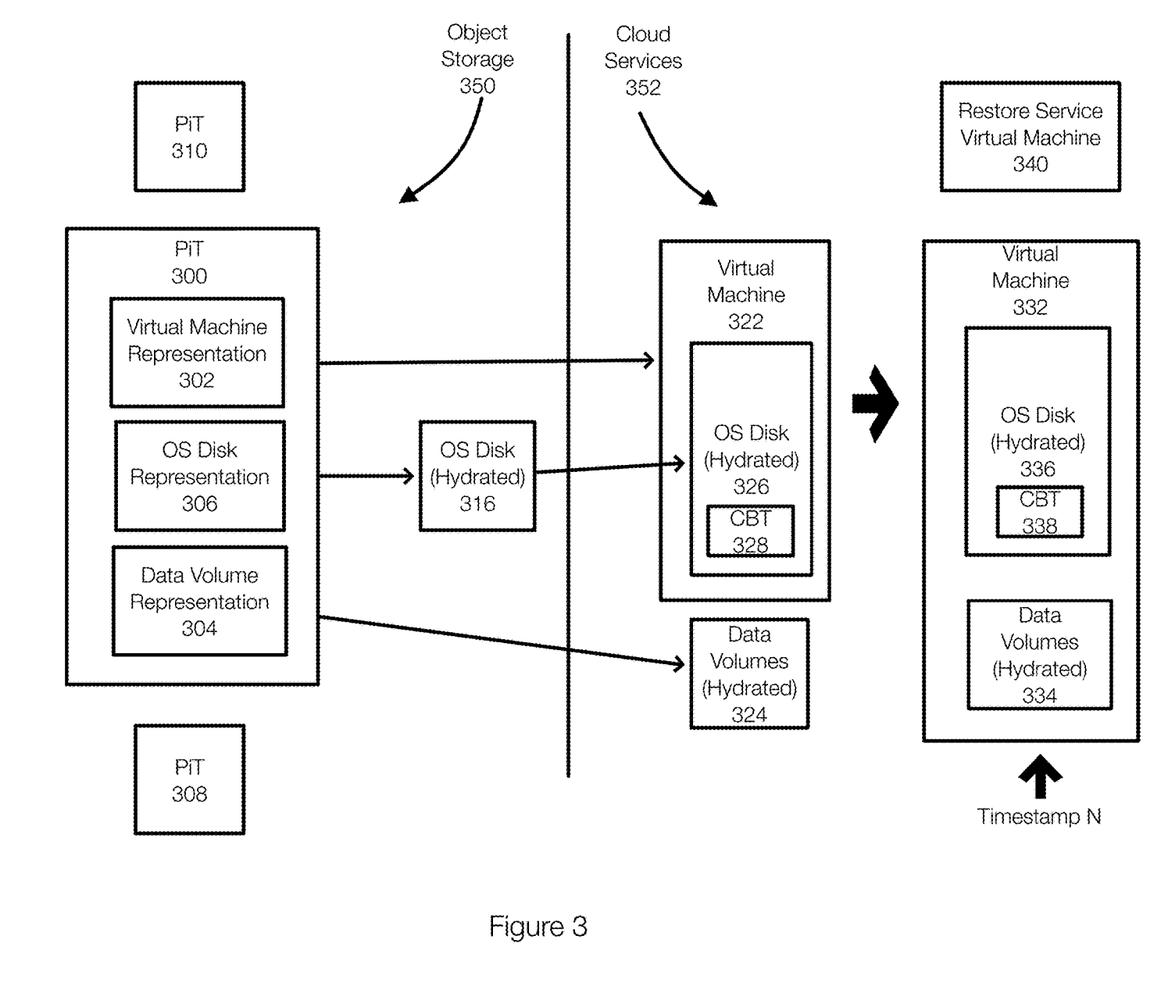
FIG. 3 illustrates an example of performing a recovery operation in a computing environment such as a cloud-based computing environment.

FIG. 3 illustrates a block diagram that includes a data protection system configured to restore a PiT backup and that allows the selected and in-process-of-recovery PiT to be moved to a different PiT. FIG. 3 illustrates backups including PiT 310, PiT 300 and PiT 308. The PiT 310 is earlier in time than the PiT 300 and the PiT 308 is later in time than PiT 300. The PiT 300 includes a virtual machine representation 302 (e.g., virtual machine configuration data) that may include or is associated with an OS disk representation 306 and a data disk or volume representation 304. The virtual machine representation 302 may also include an application representation. These representations contain sufficient information for a virtual machine to be recovered. The format of these representations may differ from the restored or recovered virtual machine. For example, the virtual machine representation 302 may be in object storage and may be recovered to block storage.

In this example, the virtual machines 322 and 332 represent the same virtual machine at different times of the recovery operation and are recovered from the virtual machine representation 302, which is associated with the OS disk representation 306 and the data disk or volume representation 304.

The PiT 300 is stored, by way of example only and not limitation, in object storage 350, which may be provided by a cloud provider or a datacenter.

The recovery operation may begin when the PiT 300 is selected for recovery, for example based on user input. After the PiT 300 is selected, the OS disk representation 306 is rehydrated in the object storage 350 as OS disk 316. As the OS disk is rehydrated, this process includes loading a change block tracker or a change block driver 324 along with the OS, for example, in the kernel.

At the same time or at a different time, the data disk representation 304, in the object storage, is rehydrated as the data volume 324 (or volumes) or volume in cloud services 352. In one example, the cloud services 352 may use a different memory or storage (e.g., block-based storage). In this example, the data volume 324 is hydrated in the region where the virtual machine will be recovered. Thus, the data volume 324 may be an EBS volume or device for example.

Next, the virtual machine is converted from the object storage 350 to the cloud services 352, which is an example of a cloud based environment in which computing is performed. The conversion may be achieved, by way of example only, by importing an image (e.g., the virtual machine representation) from the object storage 350 into the cloud services 352. After the virtual machine is converted to or imported as the virtual machine 322 and the data disk is hydrated as a device or volume in the cloud services 352, the data volume or disk 324 is attached. This results in a recovered or converted virtual machine 332 that includes an OS volume disk 336 and a data volume 334, which have been attached and mounted to the virtual machine 332. A volume may span multiple disks.

The CBT 338 is operating and tracking changes to the data volume 334 in a bitmap. Further, a copy of the bitmap is stores on one or more of the disks that constitute the volumes 334 in known locations on the disks. The bitmap allows the data protection system to move to a different PiT (e.g., the PiT 300 was incorrectly selected or the wrong PiT).

FIG. 3 also illustrates a restore service virtual machine 340. The restore service virtual machine 340 is used to move the disk (or volume) 334 to a new PiT. For example, an application running on the virtual machine 332 is stopped, the volume or disk 334 detached or unmounted from the restored virtual machine 332 (the OS remains running on the restored virtual machine 332), and the volume or disk 334 is attached to the restore service virtual machine 340. At this time or before being detached from the virtual machine 332, the data volumes 332 are returned to the state at timestamp N using the bitmap generated by the change block driver. Next, data from the PiTs is then written as necessary to the volume or disk 334 to move the data volumes 334 to the new PiT. Once the volume 334 is moved to the new PiT, the volume is detached from the restore service virtual machine 340 and attached to the restored virtual machine 332. The application is then restarted and the data is validated. If necessary, the volume is moved to yet another PiT.

Figure 4:
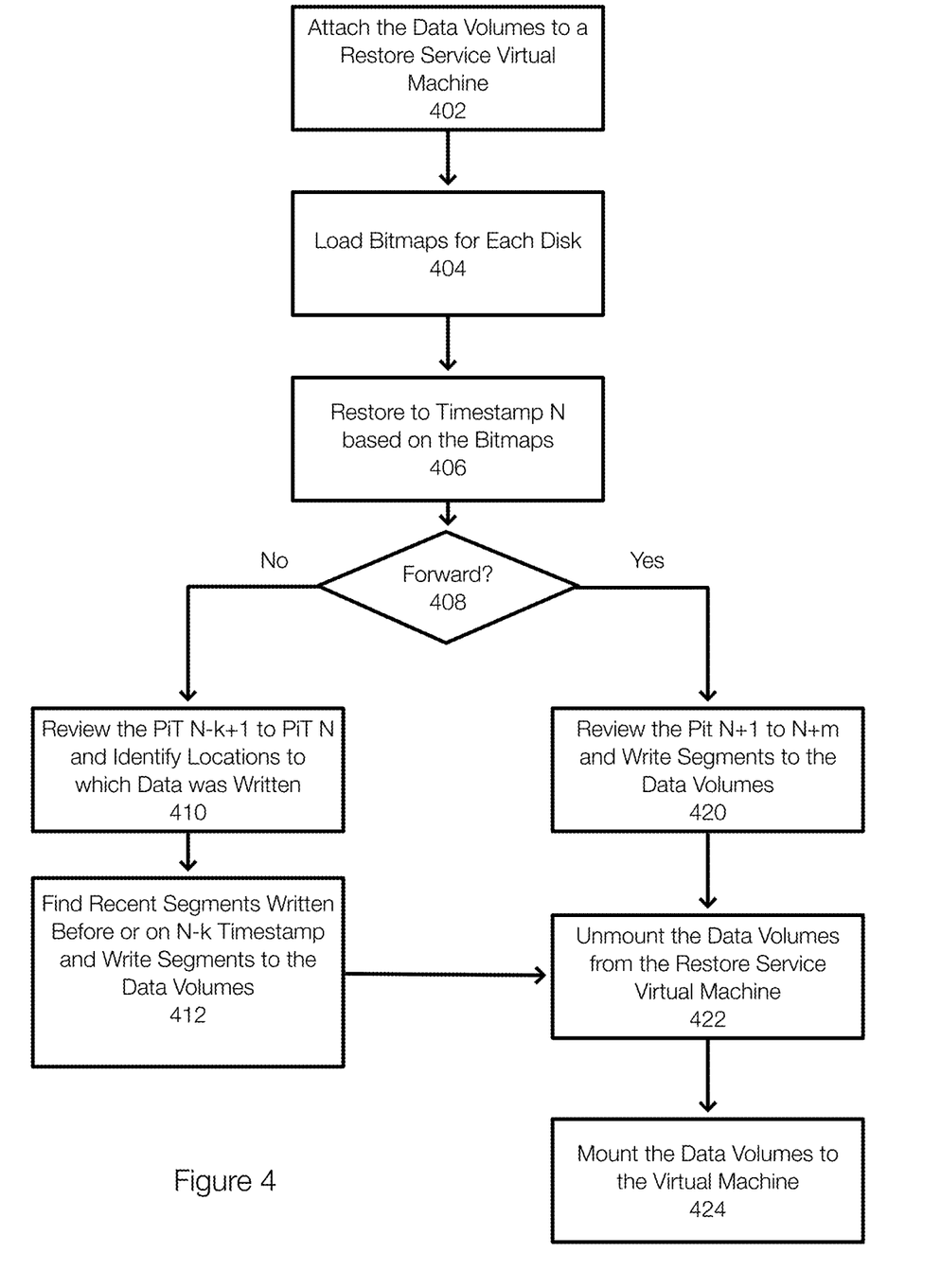
FIG. 4 illustrates an example of a method for performing a recovery operation and moving to another point in time relative to a selected point in time without starting the recovery operation from the beginning.
Figure 5:
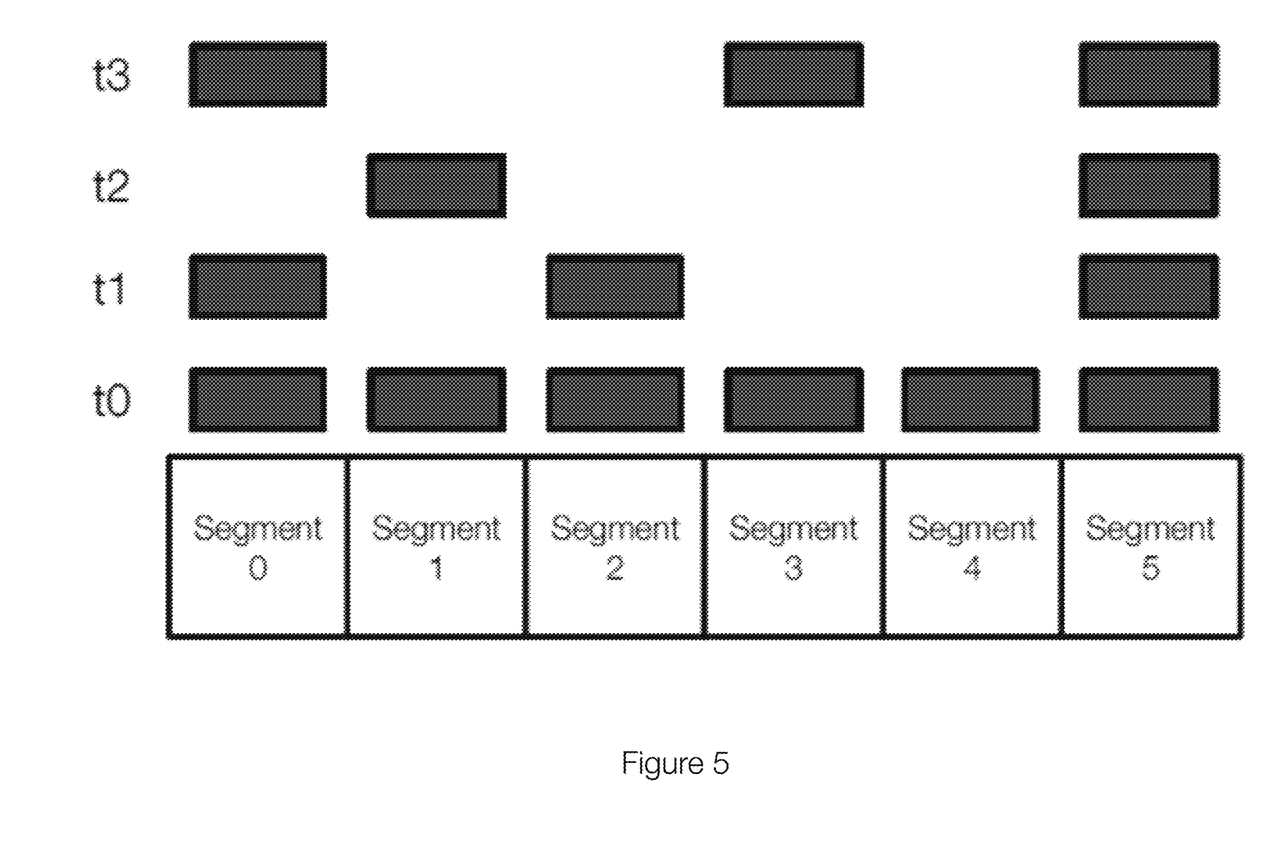
FIG. 5 illustrates an example of segments stored in multiple backups or snapshots.

FIG. 4 illustrates an example of a method for moving from a recovered virtual machine recovered from a PiT to another PiT. FIG. 4 illustrates an example where a user may want to move to a different PiT than the previously selected PiT. The discussion of FIG. 4 also references FIG. 5, which illustrates a series of PiT snapshots or backups and the state of segments at different times. More specifically, FIG. 5 illustrates segments that were written and backed up at different times. For example, the snapshot at t2 includes changes to segments 1 and 5.

When moving to a different PiT after a decision has been made to move the virtual machine to another PiT, the volumes of the virtual machine are first restored to timestamp N using bitmap (or other representation of changes to the data volumes created by the change block driver. Restoring to timestamp N is performed because changes to the data may have been made during validation and it may be necessary to restore the volume back to timestamp N, which corresponds to the virtual machine, application, and/or data at the initially selected PiT. In this example when moving to a new PiT, the volume (or volumes) is attached 402 to a restore service virtual machine after being detached from the converted or recovered virtual machine. The restore service virtual machine is a temporary virtual machine whose purpose is to read segments from the object storage or from the PiT backups and write those segments to the volume being moved to a different PiT.

The restore service virtual machine loads 404 the bitmaps for each of the disks in the volume. As previously stated, the bitmap is located at a known location on each of the disks. The segments through all points in time or at least the points of time related to the original PiT and the desired PiT can be reviewed based on the bitmap or bitmaps.

When moving forward at 408, the new PiT may be N+m. Thus, the service virtual machine reviews 420 all of the segments for the volume or disks in the object storage and moves through all PiTs N+1 through N+m. Segments for the OS disk may be ignored.

Next, the volume being move to a different PiT is updated to timestamp N+m is updated based on the review by writing the relevant segments to the volume mounted to the restore service virtual machine. If a particular segment has changed more than once, only the most recent segment (the one closest to N+m needs to be written). Updating the volume or volumes to the new PiT can be done in a parallelized manner using many threads. Multiple restore service virtual machines may also be used—each processing a different volume or data disk.

The volumes are then detached and unmounted 422 from the restore service virtual machine and attached and mounted 424 to the restored virtual machine.

For example, a user may recover to a PiT that has been associated with a timestamp N as shown in FIG. 3. After checking the recovered virtual machine, the user may decide to recover to PiT (N+m). Assume, for example, that t3 shown in FIG. 5 corresponds to timestamp N+m and t1 corresponds to timestamp N. After reverting the virtual machine or the volume of the virtual machine to PiT t1 (returning to timestamp N) using the bitmap or bitmaps generated by the change block driver, the recovery operation moves the virtual machine from PiT t1 to PiT t3.

As shown in FIG. 5, there are four segments that have changed between t1 and t3: segments 0, 1, 3, and 5. Segments 1 and 5 were written in snapshot t2 and segments 0, 3, and 5 were written in snapshot t3. The recovery operation will review these segments in all of the relevant snapshots and apply the changes to the volumes that have been attached to the recovery service virtual machine.

FIG. 4 also illustrates the process of moving to a previous or earlier PiT. Similar to moving to a later PiT, the data volumes are restored to timestamp N based on the bitmaps. Then, if 408 is No, the newly selected PiT is moved backwards in time to snapshot k for example. In this example, the backups or snapshots from PiT N-k+1 to PiT N are reviewed and locations to which data was written are identified 410.

After these locations are identified, the recent segments written before or on PiT N-k are found and written 412 to the data volumes. Thus, the segments that relate to PiT after PiT N-k are overwritten with the corresponding most recent segments written before or at PiT N-k.

FIG. 5 can also be used to illustrate the process of moving to an earlier PiT relative to a selected and recovered PiT. When moving backwards, the restore service virtual machine reviews the segments through all points in time from PiT N-k+1 to PiT N (inclusive) to identify the locations of all data or segments that were written as previously stated. This metadata identifies the dirty segments of the volumes or disks that need to be overwritten to reach PiT N-k. The restore service virtual machine will review the locations and search for the recent data segments which were written to before or on N-k at each location or segment.

The volumes are updated based on this review. The OS disk or segments can be ignored. Next, the data volumes are unmounted and detached 422 from the restore service virtual machine. The data volumes, which now correspond to timestamp or PiT N-k, are attached and mounted to the converted virtual machine 424, which is still running in one example. The application can then be relaunched and the new PiT is validated.

More specifically and with reference to FIG. 5, assume that the user first recovered to PiT t3 (timestamp N in this example). The user decides to change the recovery image to t1 (N-k timestamp) on the fly. The segments that have changed between t1 and t3 are segments 0, 1, 3 and 5. The recovery operation moves over all PiTs between N-k+1 (t2) and N (t3). The changed segments can be listed or stored for processing. The segments that have changed are: t2—segments 1 and 5, t3—segments 0, 3 and 5. This can be united as a single list of segments 0, 1, 3, and 5

Next, the recovery operation (or the restore service virtual machine) takes, for each of these segments, the data from the snapshot which is less than or equal to t1 (earlier or on t1). These segments are used to overwrite the corresponding segments or locations on the volumes attached to the restore service virtual machine. Thus, the list of changed segments includes segments 0, 1, 3, and 5. The recovery operation writes segment 0 from t1, segments 1 and 3 from t0 and segment 5 from t1 in order to recover the volumes to PiT N-k or t1 from t3. In one example, the snapshots in the cloud always contain at least one full copy that has all of the data segments. In this example, snapshot t0 is a base snapshot.

Figure 6:
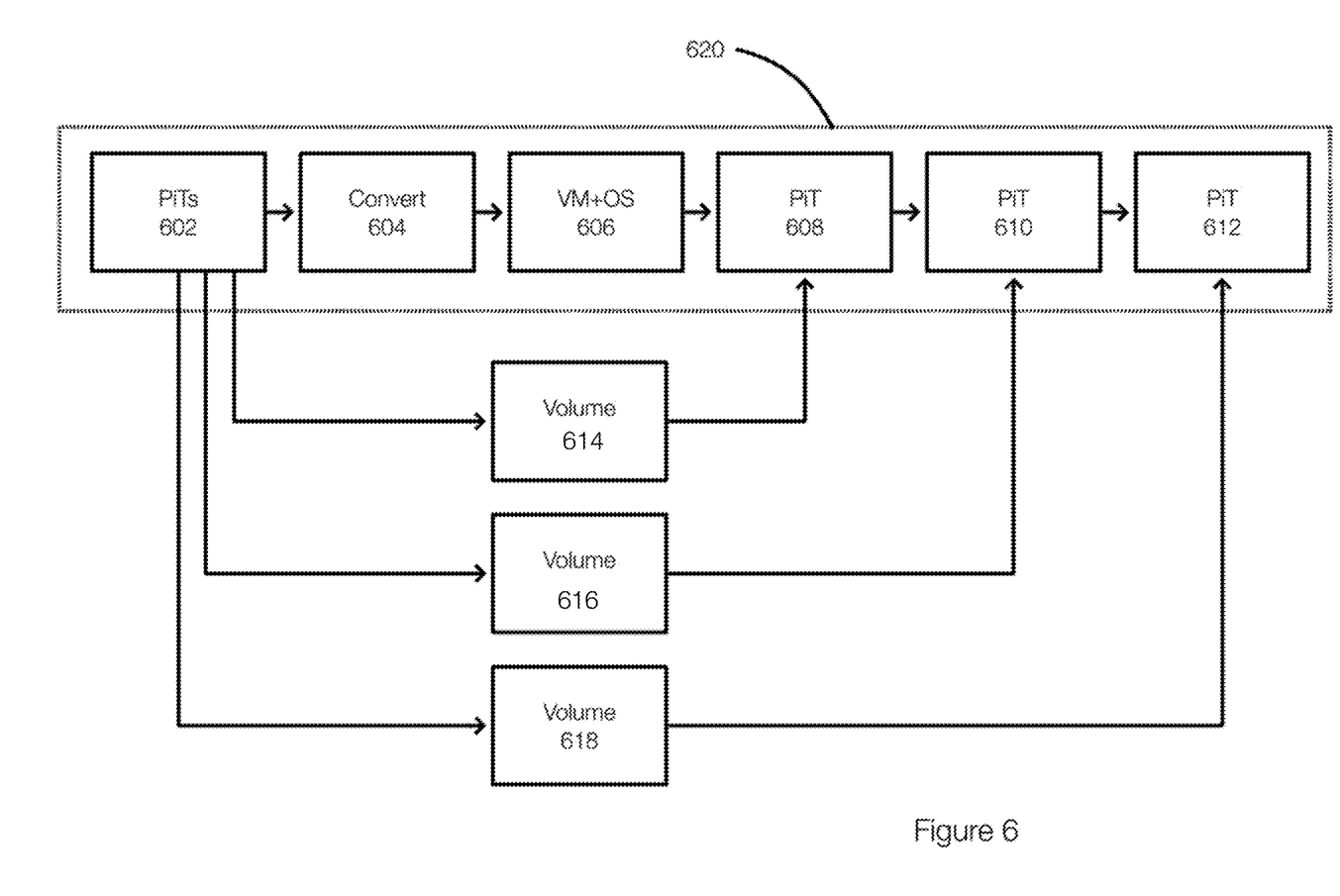
FIG. 6 illustrates an example of a recovery operation timeline that allows a user to move to a point in time that is different from an originally selected point in time on the fly or in the context of the same recovery operation.

FIG. 6 illustrates an example of performing a recovery operation and illustrates a recovery timeline. FIG. 6 illustrates a recovery operation 620 that recovers to a desired PiT. Advantageously, the recovery operation can recover to a first point in time and then recover to a second point in time without having to restart the recovery process and without having to convert the virtual machine a second time. FIG. 6 illustrates that PiTs 602 may be stored in storage. When a specific PiT is selected (e.g., PiT 608), the OS disk is hydrated and the virtual machine is converted 604 to result in a virtual machine with an OS 606. Thus, only the OS disk is converted in this example. At the same or similar time, the volume 614 corresponding to the PiT 608 from the PiTs 602 is hydrated and attached to the virtual machine after the virtual machine is converted and the volume 614 is hydrated.

Once the virtual machine and OS disk are converted and the data disk is hydrated, the PiT 608 (e.g., an operational virtual machine) is restored. If this is not the correct PiT, for example, based on a validation procedure, the recovery operation 620 can then use other disks in the PiTs 602 to move the PiT 608 to the PiT 610. This may involve establishing the volume 616 from the volume 614 (which is returned if necessary to a state at timestamp N) using the data or segments stored in the PiTs 702 based on a bitmap created by a change block driver. Similarly, the volume 618 can be updated based on the volume 616 (or the volume 614 in one example) and the PiT 612 can be generated from the using the same VM+OS 608 and attaching the hydrated volume 618.

The recovery operation 620 allows disks or volumes to be hydrated as necessary to other points in time, either before or after the PiT 608. As the virtual machine is moved from one PiT to another PiT, the OS keeps running, the disks or volumes are hydrated as needed and reattached and/or remounted. Then, the application is restarted when moving between points in time.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the RTO of recovery operations can be improved and PiT backups can be moved to other PiTs during the recovery operation on-the-fly.

In general, embodiments of the invention may be implemented in connection with systems, software, and components, that individually and/or collectively implement, and/or cause the implementation of, data protection operations.

At least some embodiments of the invention provide for the implementation of the disclosed functionality in existing backup platforms, examples of which include the Dell-EMC Disaster Recovery systems and DELL EMC RecoverPoint for VMs. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, replicate, recover and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients, agents, modules, or servers that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks (object storage, block storage, file storage), replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method comprising: identifying a point-in-time (PiT) to recover from a plurality of PiTs, converting a representation of a virtual machine in the selected PiT to a converted virtual machine, attaching an operating system (OS) disk to the converted virtual machine, starting a change block driver configured to track changes in an operating system, hydrating a data volume from the PiT and attaching the data volume to the converted virtual machine, wherein the data volume corresponds to a timestamp, operating the converted virtual machine as a restored virtual machine and running an application on the restored virtual machine, wherein the change block driver tracks changes to the data volume, and moving the data volume to a second PiT included in the plurality of PiTs using the changes tracked by the change block driver when the data volume attached to the restored virtual machine is not validated without requiring a second conversion of a second representation of the virtual machine.

Embodiment 2. The embodiment of claim 1, further comprising tracking the changes to the data volume, by the change block driver, in a bitmap.

Embodiment 3. The embodiment of claim 1 and/or 2, wherein each location in the bitmap corresponds to a portion of the data volume, wherein each disk associated with the data volume stores at least a portion of the bitmap.

Embodiment 4. The embodiment of claim 1, 2, and/or 3, wherein the bitmap is stored at a known location on the data volume or wherein a portion of the bitmap is stored on each of the disks associated with the data volume.

Embodiment 5. The embodiment of claim 1, 2, 3, and/or 4, further comprising: stopping the application without stopping operation of the operating system, restoring the data volume by reverting the changes to the data volume identified in a bitmap created by the change block driver such that the data volume corresponds to the data volume at the timestamp, and detaching the data volume from the restored virtual machine.

Embodiment 6. The embodiment of claim 1, 2, 3, 4, and/or 5, further comprising: identifying a second PiT from the plurality of PiTs, attaching the data volume to a restore service virtual machine, reviewing segments for PiTs of the data volume between the selected PiT and the second PiT, updating the data volume based on the review.

Embodiment 7. The embodiment of claim 1, 2, 3, 4, 5, and/or 6, further comprising detaching the data volume from the restore service virtual machine, attaching the data volume to the restored virtual machine, and restarting the application on the restored virtual machine.

Embodiment 8. The embodiment of claim 1, 2, 3, 4, 5, 6, and/or 7, wherein the second PiT is later in time than the selected PiT.

Embodiment 9. The embodiment of claim 1, 2, 3, 4, 5, 6, 7, and/or 8, wherein the second PiT is earlier in time than the selected PiT.

Embodiment 10. The embodiment of claim 1, 2, 3, 4, 5, 6, 7, 8, and/or 9, further comprising, when the second PiT is later in time than the selected PiT, writing segments that are identified in reviewing the segments as changed to the data volume, wherein only a latest change for a given segment is written to the data volume.

Embodiment 11. The embodiment of claim 1, 2, 3, 4, 5, 6, 7, 8, 9, and/or 10, further comprising, when the second PiT is earlier in time than the selected PiT, identifying dirty segments that need to be overwritten and overwriting the dirty segments on the data volume with most recent segments that were written to before or on the second PiT.

Embodiment 12. The embodiment of claim 1, 2, 3, 4, 5, 6, 7, 8, 9, 10, and/or 11, wherein the OS disk is hydrated from an OS representation, further comprising ignoring segments associated with the OS disk when hydrating the data volume.

Embodiment 13. The embodiment of claim 1, 2, 3, 4, 5, 6, 7, 8, 9, 10, 11, and/or 12, wherein the PiTs are stored in a first storage comprising an object storage and wherein the restored virtual machine is in a compute environment associated with a different storage, wherein converting the image of the virtual machine includes at least preparing the restored virtual machine to operate on a hypervisor, setting configurations, and adding/removing drivers.

Embodiment 14. A method for performing any of the operations, methods, or processes, or any portion of any of these, disclosed herein.

Embodiment 15. A non-transitory storage medium having stored therein instructions that are executable by one or more hardware processors to perform the operations of any one or more of embodiments 1 through 14.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

The physical computing device may include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    identifying a point-in-time (PiT) to recover from a plurality of PiTs;
    recovering the PiT as a converted virtual machine, wherein the converted virtual machines includes a data volume corresponding to a timestamp of the PiT;
    starting a change block driver with an operating system, wherein the change block tracker is configured to track changes to the data volume;
    operating the converted virtual machine as a restored virtual machine and running an application on the restored virtual machine, wherein the change block driver tracks changes to the data volume; and
    returning the data volume to the timestamp using the changes tracked by the change block driver;
    moving the data volume to a second PiT included in the plurality of PiTs without requiring a second conversion of a second representation of the virtual machine.

2. The method of claim 1, further comprising returning the data volume to the timestamp when the restored virtual machine is not validated.

3. The method of claim 2, wherein the restored virtual machine is not validated when a data disk contains an incorrect version of data.

4. The method of claim 1, further moving the data volume to the second PiT without restarting a restore operation.

5. The method of claim 4, wherein moving the data volume to the second PiT is performed on-the-fly.

6. The method of claim 1, further comprising attaching an operating system (OS) disk to the converted virtual machine, wherein the OS disk is separate from a data disk.

7. The method of claim 6, further comprising moving the data volume to the second PiT without interrupting operation of the OS disk.

8. The method of claim 1, wherein moving the data volume to the second PiT comprises:
    detaching the data volume from the restored virtual machine;
    when the second PiT is earlier in time, identifying segments that were changed and applying data written before the second PiT; and
    when the second PiT is later in time, applying segments to the data volume that have changed up to the second PiT.

9. The method of claim 8, further comprising attaching the data volume to a service virtual machine and reviewing segments for PiTs between the first PiT and the second PiT.

10. The method of claim 1, further comprising
    stopping the application without stopping operation of the operating system;
    restoring the data volume by reverting the changes to the data volume identified in a bitmap created by the change block driver such that the data volume corresponds to the data volume at the timestamp; and
    detaching the data volume from the restored virtual machine.

11. A non-transitory storage medium having stored therein instructions that are executable by one or more hardware processors to perform operations comprising:
    identifying a point-in-time (PiT) to recover from a plurality of PiTs;
    recovering the PiT as a converted virtual machine, wherein the converted virtual machines includes a data volume corresponding to a timestamp of the PiT;
    starting a change block driver with an operating system, wherein the change block tracker is configured to track changes to the data volume;
    operating the converted virtual machine as a restored virtual machine and running an application on the restored virtual machine, wherein the change block driver tracks changes to the data volume; and
    returning the data volume to the timestamp using the changes tracked by the change block driver;
    moving the data volume to a second PiT included in the plurality of PiTs without requiring a second conversion of a second representation of the virtual machine.

12. The non-transitory storage medium of claim 11, further comprising returning the data volume to the timestamp when the restored virtual machine is not validated.

13. The non-transitory storage medium of claim 12, wherein the restored virtual machine is not validated when a data disk contains an incorrect version of data.

14. The non-transitory storage medium of claim 11, further moving the data volume to the second PiT without restarting a restore operation.

15. The non-transitory storage medium of claim 14, wherein moving the data volume to the second PiT is performed on-the-fly.

16. The non-transitory storage medium of claim 11, further comprising attaching an operating system (OS) disk to the converted virtual machine, wherein the OS disk is separate from a data disk.

17. The non-transitory storage medium of claim 16, further comprising moving the data volume to the second PiT without interrupting operation of the OS disk.

18. The non-transitory storage medium of claim 11, wherein moving the data volume to the second PiT comprises:

detaching the data volume from the restored virtual machine;

when the second PiT is earlier in time, identifying segments that were changed and applying data written before the second PiT; and when the second PiT is later in time, applying segments to the data volume that have changed up to the second PiT.

19. The non-transitory storage medium of claim 18, further comprising attaching the data volume to a service virtual machine and reviewing segments for PiTs between the first PiT and the second PiT.

20. The non-transitory storage medium of claim 11, further comprising stopping the application without stopping operation of the operating system;

restoring the data volume by reverting the changes to the data volume identified in a bitmap created by the change block driver such that the data volume corresponds to the data volume at the timestamp; and detaching the data volume from the restored virtual machine.

* * * * *